United States Patent
Mantor et al.

(10) Patent No.: US 8,854,381 B2
(45) Date of Patent: Oct. 7, 2014

(54) PROCESSING UNIT THAT ENABLES ASYNCHRONOUS TASK DISPATCH

(75) Inventors: Michael Mantor, Orlando, FL (US); Rex McCrary, Oviedo, FL (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 952 days.

(21) Appl. No.: 12/874,134

(22) Filed: Sep. 1, 2010

(65) Prior Publication Data
US 2011/0115802 A1   May 19, 2011

Related U.S. Application Data

(60) Provisional application No. 61/239,712, filed on Sep. 3, 2009.

(51) Int. Cl.
| G06F 15/80 | (2006.01) |
| G06F 15/16 | (2006.01) |
| G06F 9/50  | (2006.01) |
| G06T 15/00 | (2011.01) |
| G06T 1/20  | (2006.01) |

(52) U.S. Cl.
CPC ............ *G06F 9/5027* (2013.01); *G06F 9/5066* (2013.01); *G06T 15/005* (2013.01); *G06T 1/20* (2013.01); *G06F 9/5061* (2013.01)
USPC ........................................................ 345/505

(58) Field of Classification Search
CPC .................. G06F 15/00; G06F 15/16–15/161; G06F 15/80–15/8092; G06T 1/00–1/0092
USPC ................... 345/502, 505, 501; 718/102, 103
See application file for complete search history.

(56) References Cited

U.S. PATENT DOCUMENTS

| 6,252,600  | B1  |   | 6/2001  | Kohli et al. |         |
|------------|-----|---|---------|--------------|---------|
| 8,284,205  | B2  | * | 10/2012 | Miller et al.| 345/502 |
| 8,345,053  | B2  | * | 1/2013  | Jiao et al.  | 345/505 |
| 2003/0030643 | A1 | * | 2/2003 | Taylor et al. | 345/531 |
| 2007/0030278 | A1 | * | 2/2007 | Prokopenko et al. | 345/506 |
| 2007/0273698 | A1 | * | 11/2007 | Du et al. | 345/501 |
| 2008/0109810 | A1 |   | 5/2008 | Pronovost et al. | |
| 2009/0160867 | A1 |   | 6/2009 | Grossman | |
| 2011/0050712 | A1 | * | 3/2011 | Jackson | 345/503 |

FOREIGN PATENT DOCUMENTS

EP          0 475 421 A2     3/1992

OTHER PUBLICATIONS

International Search Report and Written Opinion, dated Sep. 29, 2011, for PCT Appl. No. PCT/US2010/047786, 14 pages.

* cited by examiner

*Primary Examiner* — Jacinta M Crawford
(74) *Attorney, Agent, or Firm* — Sterne, Kessler, Goldstein & Fox PLLC (57) ABSTRACT

A processing unit that includes a plurality of virtual engines and a shader core. The plurality of virtual engines is configured to (i) receive, from an operating system (OS), a plurality of tasks substantially in parallel with each other and (ii) load a set of state data associated with each of the plurality of tasks. The shader core is configured to execute the plurality of tasks substantially in parallel based on the set of state data associated with each of the plurality of tasks. The processing unit may also include a scheduling module that schedules the plurality of tasks to be issued to the shader core.

27 Claims, 6 Drawing Sheets

PROCESSING UNIT THAT ENABLES ASYNCHRONOUS TASK DISPATCH

CROSS REFERENCE TO RELATED APPLICATIONS

This application claims benefit under 35 U.S.C. §119(e) to U.S. Provisional Patent Application No. 61/239,712, entitled "A Processing Unit that Enables Asynchronous Task Dispatch," to Mantor et al., filed Sep. 3, 2009, the entirety of which is hereby incorporated by reference as if fully set forth herein.

BACKGROUND OF THE INVENTION

1. Field of the Invention

The present invention is generally directed to computing operations performed in computer systems. More particularly, the present invention is directed to a processing unit, such as a graphics-processing unit (GPU), that performs computing operations and applications thereof.

2. Background

A GPU is a complex integrated circuit that is adapted to perform data-parallel computing tasks, such as graphics-processing tasks. A GPU may, for example, execute graphics-processing tasks required by an end-user application, such as a video-game application. The GPU may be a discrete (i.e., separate) device and/or package or may be included in the same device and/or package as another processor (e.g., a central processing unit (CPU)). For example, GPUs are frequently integrated into routing or bridge devices such as, for example, Northbridge devices.

There are several layers of software between the end-user application and the GPU. The end-user application communicates with an application-programming interface (API). An API allows the end-user application to output graphics data and commands in a standardized format, rather than in a format that is dependent on the GPU. Several types of APIs are commercially available, including DirectX® developed by Microsoft Corporation of Redmond, Wash. and OpenGL® promulgated by the Khronos Group. The API communicates with a driver. The driver translates standard code received from the API into a native format of instructions understood by the GPU. The driver is typically written by the manufacturer of the GPU. The GPU then executes the instructions from the driver.

A graphics-processing task performed by a GPU typically involves complex mathematical computations, such as matrix and vector operations. To perform a single graphics-processing task, a GPU may execute a plurality of different threads (sequence of instructions). Each thread may comprise a shader program, such as a geometry shader, a pixel shader, a vertex shader, or the like. Each thread (e.g., shader program) is typically associated with a set of state data (such as texture handles, shader constants, transform matrices, or the like) that is locally stored in data-storage units of the GPU. The locally stored state data is called a context.

To efficiently execute the various threads (e.g., shader programs) of a single graphics-processing task, the GPU includes an array of processing elements, called a shader core. The array of processing elements is organized into single-instruction, multiple-data (SIMD) devices. Multiple threads (e.g., shader programs) may be issued to the shader core at the same time, with the data needed to execute each thread (e.g., shader program) being distributed in parallel to different processing elements of the shader core. The different processing elements may then perform operations on the data in parallel. In this way, a GPU can perform the complex mathematical computations required for a graphics-processing task more quickly than a typical central-processing unit (CPU). As a result, if a computing system includes a GPU, graphics-processing tasks (and other types of data-parallel processing tasks) are typically passed to the GPU, rather than the CPU.

To pass tasks to the GPU, an operating-system (OS) scheduler stores the tasks in a command buffer. A conventional GPU processes one command buffer at a time. The OS scheduler serially places tasks in the command buffer, and the GPU typically processes the tasks in the order in which they are placed in the command buffer. In some instances, however, the GPU may process tasks out of the order in which they were placed in the command buffer. For example, the GPU may interrupt the execution of a first task to execute a more-important (e.g., low-latency) task that was placed in the command buffer after the first task.

To perform the more-important (e.g., low-latency) task before the first task has finished completing in the shader core of the GPU, a conventional GPU performs a context switch. That is, the state data associated with the threads of the first task are swapped into back-up storage units maintained by the conventional GPU, and new state data associated with the threads (e.g., shader programs) of the more-important (e.g., low-latency) task are retrieved and placed in the data-storage units of the shader core. The shader core then executes the threads (e.g., shader programs) of the more-important (e.g., low-latency) task based on the new state data in the data-storage units. After the more-important (e.g., low-latency) task finishes executing, the state data associated with the threads of the more-important (e.g., low-latency) task are flushed from the data-storage units, and the state data from the threads of the first task are swapped back into the data-storage units of the shader core. Then, the shader core can resume executing the threads of the first task.

Although context switching allows a GPU to process tasks out of the order in which they were placed in the command buffer, context switching is problematic for several reasons. As an initial matter, a substantial amount of time is required to perform a context switch, thereby limiting the performance of the GPU. Also, context switching requires additional local memory (e.g., back-up storage units) to store the context that is being switched. The additional local memory takes up precious chip area, resulting in a larger GPU.

In addition to requiring a substantial amount of time and area, context switching makes the GPU ineffective at processing low-latency, high-priority tasks. To prepare the shader core for executing a low-latency, high-priority task, a conventional GPU must perform a context switch. The time associated with the context switch (e.g., hundreds of clock cycles) makes the effective time for executing the low-latency, high-priority task relatively long, even though the actual time for executing the low-latency, high-priority task may be relatively short (e.g., tens of clock cycles).

Given the foregoing, what is needed is a processing unit that can efficiently process important (e.g., low-latency) tasks without context switching.

BRIEF SUMMARY OF EMBODIMENTS OF THE INVENTION

Embodiments of the present invention meet the above-described needs by providing methods, apparatuses, and systems for enabling asynchronous task dispatch and applications thereof.

For example, an embodiment of the present invention provides a processing unit that includes a plurality of virtual engines and a shader core. The plurality of virtual engines is configured to (i) receive, from an operating system (OS), a plurality of tasks substantially in parallel with each other and (ii) load a set of state data associated with each of the plurality of tasks. The shader core is configured to execute the plurality of tasks substantially in parallel based on the set of state data associated with each of the plurality of tasks. The processing unit may also include a scheduling module that schedules the plurality of tasks to be issued to the shader core.

In another embodiment, the processing unit is defined in software. In this embodiment, a computer-program product includes a computer-readable storage medium containing instructions which, if executed on a computing device, define the processing unit.

In a further embodiment, the processing unit is included in a computing system. In this embodiment, the computing system includes a memory, a first processing unit, a second processing unit, and a bus coupled to the memory, the first processing unit, and the processing unit. An example computing system may include, but is not limited to, a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a processing unit.

Another embodiment of the present invention provides a computer-implemented method for processing tasks in a processing unit. This computer-implemented method includes several operations. In a first operation, a plurality of tasks are received, from an operating system (OS), in parallel with each other. In a second operation, a set of state data associated with each of the plurality of tasks is loaded. In a third operation, the plurality of tasks are executed substantially in parallel in a shader core based on the set of state data associated with each of the plurality of tasks. This computer-implemented method may also include scheduling the plurality of tasks to be issued to the shader core.

A further embodiment of the present invention provides a computer-implemented method for providing tasks to a processing unit. This method includes several operations. In a first operation, a plurality of tasks are received from one or more applications, wherein each task includes an indication of a priority type. In a second operation, the processing unit is provided with the plurality of tasks and the indication of the priority type associated with each task. In an embodiment, instructions stored on a computer-readable storage medium of a computer-program product may cause a computing device to perform this method, if the instructions are executed by the computing device.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Overview

Embodiments of the present invention provide a processing unit that enables asynchronous task dispatch and applications thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In accordance with an embodiment, a processing unit includes a plurality of virtual engines embodied on a single shader core. Each virtual engine is configured to receive data-parallel processing tasks (e.g., graphics-processing tasks and general-compute tasks) and independently execute these tasks on the single shader core. In this way, the processing unit may execute two or more different streams of processing tasks—such as, a first stream of low-latency processing tasks and a second stream of standard graphics-processing tasks—without requiring a context switch. Executing two or more different streams of processing tasks provides the low-latency benefits of context switching without the overhead associated with stopping and draining the processing unit of data. In fact, embodiments of the present invention enable multiple contexts to exist and be executed (substantially) simultaneously in a single shader core.

For illustrative purposes only, and not limitation, embodiments of the present invention will be described herein in terms of a GPU. A person skill in the relevant art(s) will appreciate, however, that embodiments of the present invention may be applied to other types of processing units, such as central processing units and coprocessors, that receive streams of processing tasks. These other types of processors are contemplated within the spirit and scope of the present invention.

In embodiments, the GPU processes a plurality of commands buffers. Low-latency processing tasks may, for example, be placed in a first command buffer, and standard graphics-processing tasks may, for example, be placed in a second command buffer. A first virtual engine of the GPU retrieves the low-latency processing tasks, and a second virtual engine of the GPU retrieves the standard graphics-processing tasks. Tasks from each virtual engine are then issued to a single shader core substantially in parallel with each other.

To enable the single shader core to (substantially) simultaneously process tasks from two or more different virtual engines, resources of the shader core are partitioned in space and/or time. To achieve spatial partitioning, for example, a first (e.g., low-latency) task from a first virtual engine is issued to a first subset of processing elements (SIMDs) of the shader core, and a second (e.g., standard graphics) task from a second virtual engine is issued to a second subset of processing elements (SIMDs) of the shader core. To achieve temporal partitioning, for example, the first and second tasks share a percentage of time of the processing elements (SIMDs) of the shader core. In an embodiment, the GPU includes a scheduling module to schedule the tasks from the two or more different virtual engines for execution on the shader core.

Sharing the resources of the GPU to provide a plurality of virtual engines in accordance with embodiments of the present invention improves the use of the GPU resources, especially on large chips. Two or more streams of tasks can be issued to a single shader core, enabling the GPU to efficiently use computational and input/output facilities. For example, resources (e.g., SIMDs) of the GPU shader core can be divided between concurrent tasks based on demand, priority, and/or preset limits—while temporarily enabling any one task to (substantially) fully consume the resources of the GPU.

Further details of an example GPU in accordance with an embodiment of the present invention are described below. Before providing these details, however, it is helpful to describe an example system in which such a GPU may be implemented.

II. An Example System

Figure 1:
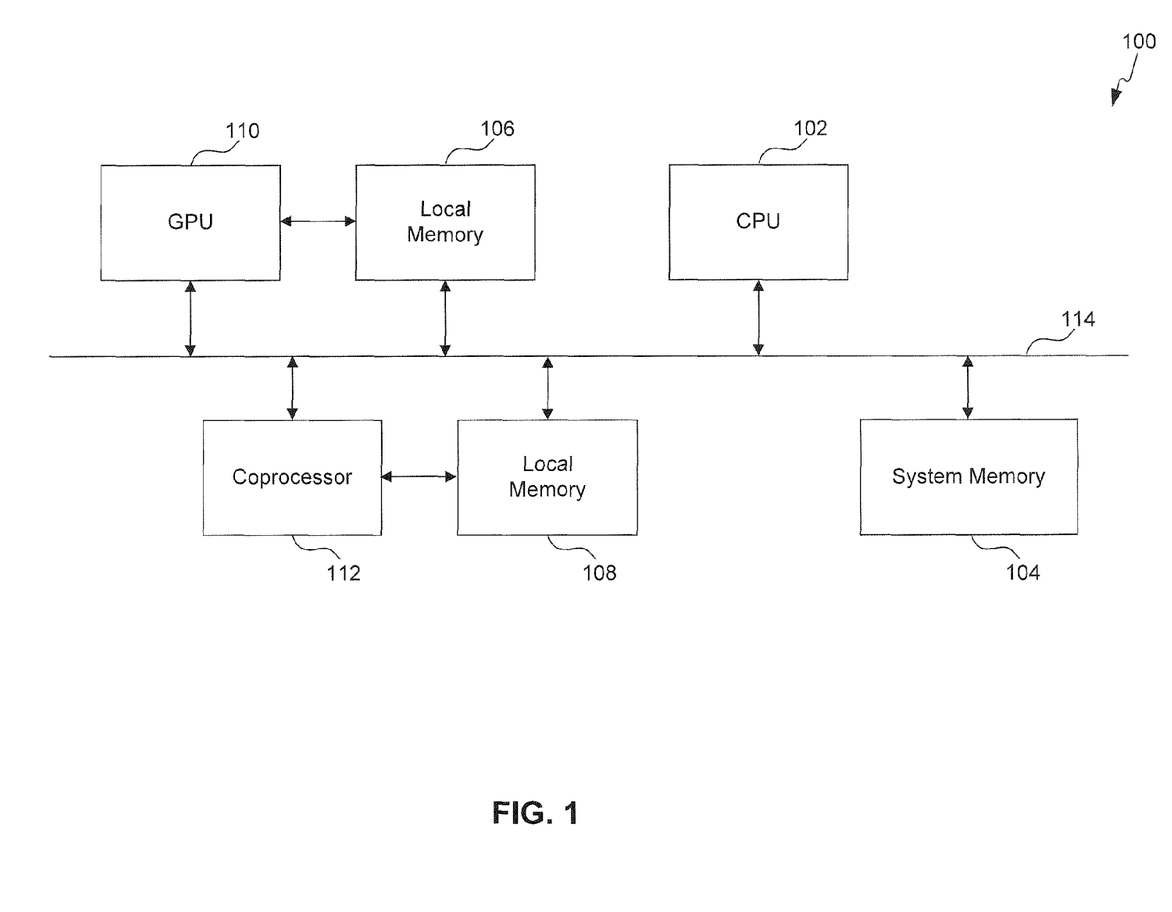
FIG. 1 is a block diagram illustrating an example computer system in accordance with an embodiment of the present invention.

FIG. 1 is a block diagram of a computing system 100 according to an embodiment. Computing system 100 includes a CPU 102, a GPU 110, and may optionally include a coprocessor 112. In the embodiment of FIG. 1, CPU 102 and GPU 110 are shown as separate blocks. This is for illustrative purposes only, and not limitation. A person skilled in the relevant art(s) will understand that CPU 102 and GPU 110 may be included in separate packages or may be combined in a single package or integrated circuit.

Computing system 100 also includes a system memory 104 that may be accessed by CPU 102, GPU 110, and coprocessor 112. In embodiments, computing system 100 may comprise a supercomputer, a desktop computer, a laptop computer, a video-game console, an embedded device, a handheld device (e.g., a mobile telephone, smart phone, MP3 player, a camera, a GPS device, or the like), or some other device that includes or is configured to include a GPU.

GPU 110 assists CPU 102 by performing certain special functions (such as, graphics-processing tasks and data-parallel, general-compute tasks), usually faster than CPU 102 could perform them in software. GPU 110 includes a plurality of virtual engines that share resources of a single shader core. In this way, the plurality of virtual engines of GPU 110 can execute a plurality of tasks substantially in parallel. In embodiments, GPU 110 may be integrated into a chipset and/or CPU 102. Additional details of GPU 110 are provided below.

Coprocessor 112 also assists CPU 102. Coprocessor 112 may comprise, but is not limited to, a floating point coprocessor, a GPU, a networking coprocessor, and other types of coprocessors and processors as would be apparent to a person skilled in the relevant art(s).

GPU 110 and coprocessor 112 communicate with CPU 102 and the system memory over a bus 114. Bus 114 may be any type of bus used in computer systems, including a peripheral component interface (PCI) bus, an accelerated graphics port (AGP) bus, a PCI Express (PCIS) bus, or another type of bus whether presently available or developed in the future.

In addition to system memory 104, computing system 100 further includes local memory 106 and local memory 108. Local memory 106 is coupled to GPU 110 and may also be coupled to bus 114. Local memory 108 is coupled to coprocessor 112 and may also be coupled to bus 114. Local memories 106 and 108 are available to GPU 110 and coprocessor 112 respectively in order to provide faster access to certain data (such as data that is frequently used) than would be possible if the data were stored in system memory 104.

In an embodiment, GPU 110 and coprocessor 112 decode instructions in parallel with CPU 102 and execute only those instructions intended for them. In another embodiment, CPU 102 sends instructions intended for GPU 110 and coprocessor 112 to respective command buffers.

Although not specifically illustrated in FIG. 1, computing system 100 may also include or be coupled to a display device (e.g., cathode-ray tube, liquid crystal display, plasma display, or the like). The display device is used to display content to a user (such as, when computing system 100 comprises a computer, video-game console, or handheld device).

III. An Example GPU

Figure 2:
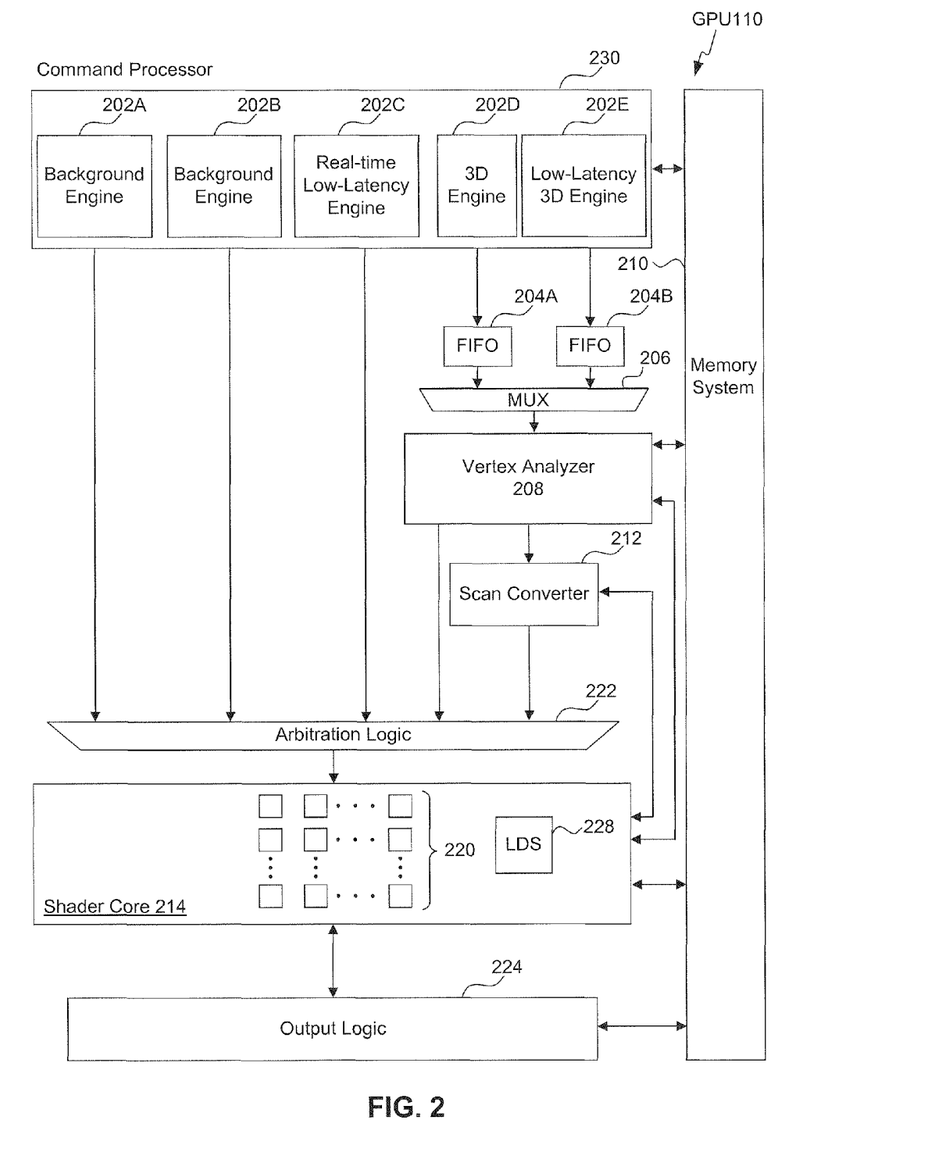
FIG. 2 is a block diagram of an example GPU in accordance with an embodiment of the present invention.

As mentioned above, GPU 110 includes a plurality of virtual engines embodied on a shader core. Each virtual engine is configured to execute a stream of processing tasks provided by an OS scheduler, wherein each processing task of a given stream may include a plurality of individual processing threads. Because GPU 110 includes a plurality of virtual engines, GPU 110 can execute the different streams of processing tasks from the OS scheduler without requiring a context switch. In fact, in embodiments GPU 110 (substantially) simultaneously executes tasks from a plurality of streams, which correspond to a plurality of different contexts, in a single shader core by sharing resources of the shader core among the tasks.

FIG. 2 is a block diagram illustrating example hardware components of
GPU 110. Referring to FIG. 2, GPU 110 includes a command processor 230, input logic (including a vertex analyzer 208, scan converter 212, and arbitration logic 222), a shader core 214, output logic 224, and a memory system 210. Each of these components is described below.

A. Command Processor

Command processor 230 receives tasks (e.g., graphics-processing and general-compute tasks) from one or more command buffers filled by the OS scheduler. As illustrated in FIG. 3, command processor 230 includes a plurality of virtual engines that share resources of GPU 110. The different virtual engines of command processor 230 process different types of tasks.

In the embodiment of FIG. 2, command processor 230 includes a first background engine 202A, a second background engine 202B, a real-time low-latency engine 202C, a primary 3D engine 202D, and a low-latency 3D engine 202E. Background engines 202 process low-priority tasks. It is to be appreciate, however, that command processor 230 may include other types of virtual engines. Background engines 202 take over the resources of GPU 110 only when no other virtual engines are using the resources of GPU 110. Real-time low-latency engine 202C has priority access to the resources of GPU 110 in order to process high-priority tasks. Primary 3D engine 202D processes standard graphics-processing tasks, and low-latency 3D engine 202E processes high-priority graphics-processing tasks. Low-latency 3D engine 202E has priority access to the graphics-processing resources of GPU 110.

Before being issued to shader core 214 of GPU 110, tasks from command processor 230 are provided to input logic.

B. Input Logic

Input logic arbitrates which tasks are issued to shader core 214. In an embodiment, input logic implements a software routine to schedule the tasks for execution in shader core 214 based on the availability of the resources of shader core 214 and the relative priority of the various tasks. In the embodiment of FIG. 3, input logic includes graphics pre-processing logic (which prepares graphics-processing tasks for issuance to shader core 214) and arbitration logic 222 (which provides tasks to shader core 214).

Graphics pre-processing logic includes vertex analyzer 208 and scan converter 212. Tasks from primary 3D engine 202D and low-latency 3D engine 202E are sent to the graphics pre-processing logic. First-in, first-out (FIFO) buffer 204A receives the tasks from primary 3D engine 202D, and FIFO buffer 204B receives the tasks from low-latency 3D engine 202E. Multiplexer 206 provides tasks from one of FIFO buffers 204 to vertex analyzer 208.

Vertex analyzer 208 identifies shader programs associated with a graphics-processing and/or general-compute task and schedules when each shader program can be launched in shader core 214 based on input and output data that will be available. In addition to scheduling shader programs for launch, vertex analyzer 208 also generates pointers to a vertex buffer and includes connectivity data. The pointers are used to read vertices from a vertex buffer. If a vertex has already been processed and is stored in the vertex buffer, vertex analyzer 208 may read that vertex from the vertex buffer, so that a vertex is only processed one time. The connectivity data specifies how vertices fit together to make a primitive (e.g., triangle), so that the primitive can be rasterized properly.

Vertex analyzer 208 sends graphics-processing tasks to scan converter 212 and sends general-compute tasks to arbitration logic 222. Scan converter 212 traverses the primitives to determine pixels to be processed by shader core 214. Scan converter 212 then sends the pixels to arbitration logic 222. Arbitration logic 222 includes a plurality of multiplexers to provide the tasks from the different virtual engines of command processor 230 to shader core 214.

C. Shader Core

Shader core 214 includes a plurality of processing elements 220 for executing the tasks provided to GPU 110. Processing elements 220 are arranged as SIMD devices, enabling shader core 214 to execute a plurality of data-parallel processing tasks (substantially) simultaneously. To enable shader core 214 to (substantially) simultaneously process tasks from the plurality of virtual engines of command processor 230, processing elements 220 of shader core 214 are partitioned in space and/or time.

To achieve spatial partitioning, different subsets of processing elements 220 are configured to execute different tasks. For example, a first (e.g., low-latency) task from a first virtual engine (e.g., real-time low-latency engine 202C) may be issued to a first subset of processing elements 220 of shader core 214, and a second (e.g., standard graphics) task from a second virtual engine (e.g., primary 3D engine 202D) may be issued to a second subset of processing elements 220 of shader core 214. Each subset of processing elements 220 then independently executes the task it received.

To achieve temporal partitioning, different processing tasks of different virtual engines share a percentage of time of processing elements 220 of shader core 214. From the example above, the first and second tasks share a percentage of time of processing elements 220 of shader core 214.

Shader core 214 also includes one or more local data shares (LDS) 228 for storing data used by processing elements 220 to execute the processing tasks provided by the OS scheduler. LDS 228 stores state data associated with each task to be executed by shader core 214. In an embodiment, LDS 228 stores the state data of a plurality of different contexts, enabling shader core 214 to (substantially) simultaneously execute a plurality of different tasks from OS scheduler associated with the plurality of different contexts without requiring a context switch.

Intermediate results of processing elements 220 may be reprocessed in shader core 214. For example, processing elements 220 may implement a plurality of different shader programs (e.g., geometry shader, vertex shader, pixel shader, tessellation shader, or the like) to complete a single graphics-processing task provided by the OS scheduler. The intermediate results of the different shader programs are sent back to vertex analyzer 208 and/or scan converter 212 and eventually recirculated to processing elements 220. After processing elements 220 have completed a task provided by the OS scheduler, the final results are provided to output logic 224.

D. Output Logic

Output logic 224 includes a plurality of buffers, including write-combining caches, depth buffers, and color buffers. The write-combining caches combine data to be written to off-chip memory, enabling efficient access to off-chip memory. The depth buffers buffer results for z-testing. The color buffers buffer results for color blending. After performing the processes associated with the write-combining caches, depth buffers, and color buffers, output logic 224 provides the results to memory system 210.

E. Memory System

Memory system 210 includes one or more on-chip caches and one or more off-chip memory interfaces. Memory system 210 is coupled to each of command processor 230, vertex analyzer 208, scan converter 212, shader core 214, and output logic 224. When data is needed by any of these components to execute a shader program, a request is made to the on-chip cache of memory system 210. If there is a hit in the on-chip cache (i.e., the requested data is in the on-chip cache), the data is forwarded to the component that requested it. If there is a miss in the on-chip cache (i.e., the requested data is not in the on-chip cache), the requested data must be retrieved from off-chip memory (e.g., system memory 104 of FIG. 1) via the off-chip memory interface of memory system 210. After the data is retrieved from off-chip memory, the data is forwarded to the component that requested it. In addition, the data is also stored in the on-chip cache using cache memory techniques that are well known to persons skilled in the relevant art(s).

IV. Example Operation

GPU 110 is configured to execute a plurality of streams of processing tasks provided by an OS scheduler. The plurality of streams of processing tasks may be generated by a single application or more than one application.

Figure 3A:
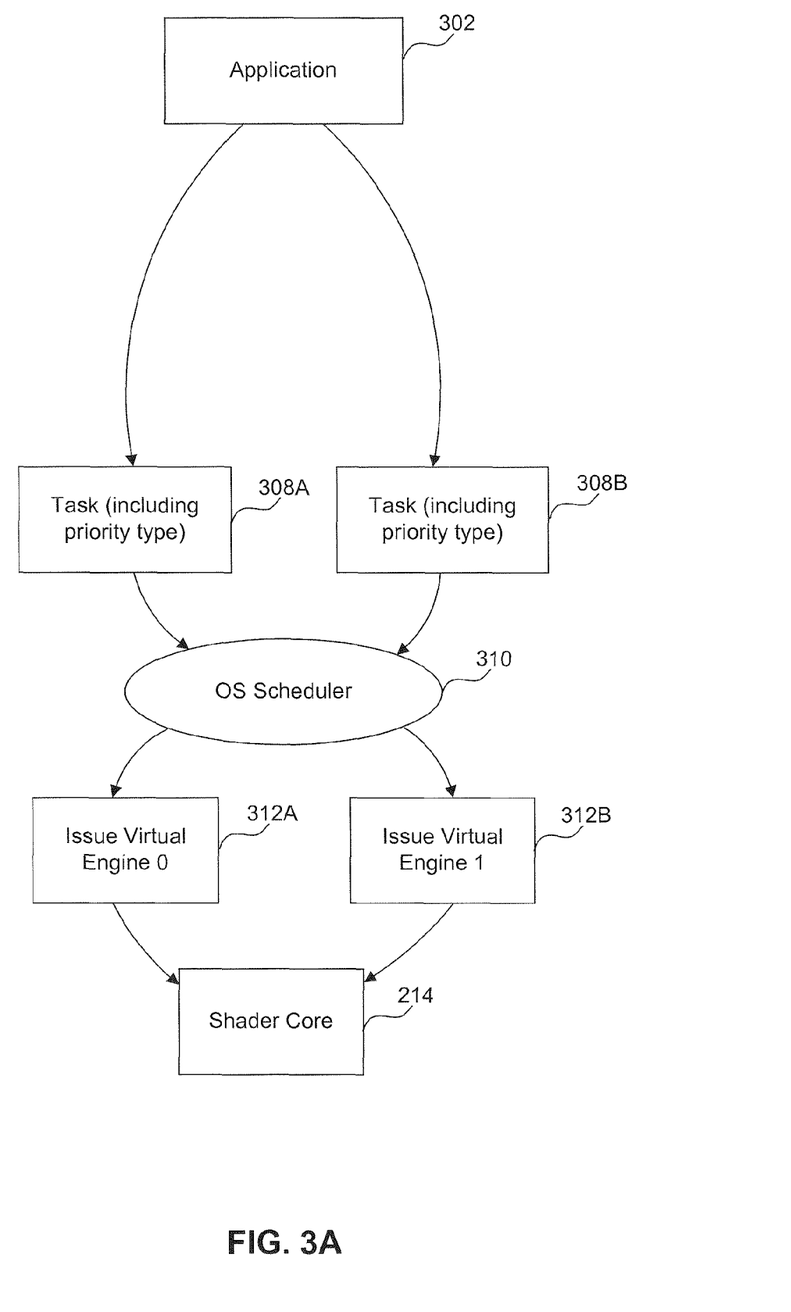
FIGS. 3A and 3B are block diagrams illustrating example work flows for issuing tasks to virtual engines of a GPU in accordance with an embodiment of the present invention.

FIG. 3A illustrates an example in which shader core 214 (substantially) simultaneously executes two (or more) different streams of processing tasks, wherein the streams of processing tasks are generated by a single application 302. Application 302 may be, for example, an end-user application that generates graphics-processing tasks (such as a video-game application, a computer-aided design (CAD) application, or the like) or an end-user application that generates general-compute tasks (e.g., mathematical algorithms, physics simulations, or the like) to be executed on a GPU. Referring to FIG. 3A, application 302 generates a first task 308A and a second task 308B. Each task 308 that application 302 generates includes a priority type. For example, application 302 may indicate that first task 308A is a low-latency, high-priority task and second task 308B is a standard priority task. OS scheduler 310 receives the tasks generated by application 302 and issues the tasks to different virtual engines of GPU 110. For example, OS scheduler 310 issues first task 308A to a first virtual engine 312A and issues second task 308B to a second virtual engine 312B. The tasks from each virtual engine 312 are then (substantially) simultaneously executed by shader core 214 of GPU 110.

Figure 3B:
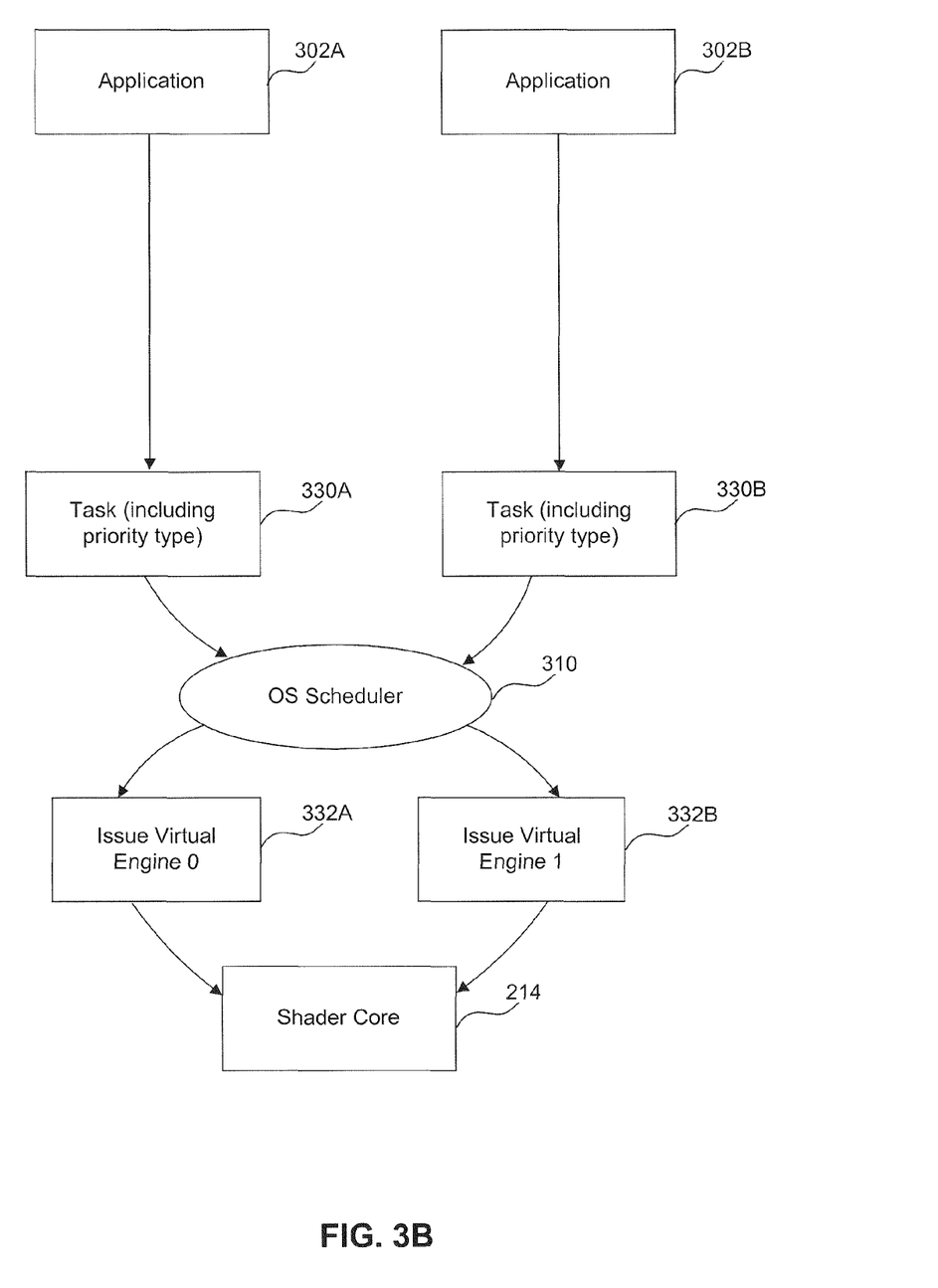

FIG. 3B illustrates an example in which shader core 214 (substantially) simultaneously executes two (or more) different streams of processing tasks, wherein each stream is generated by a different application. As illustrated in FIG. 3B, a first processing task 330A is generated by a first application 302A, and a second processing task 330B is generated by a second application 302B. Each task 330 includes a priority type. OS scheduler 310 receives tasks 330 and issues them to different virtual engines of GPU 110. For example, OS scheduler 310 issues first task 330A to a first virtual engine 332A and issues second task 330B to a second virtual engine 332B. The tasks from each virtual engine 332 are then (substantially) simultaneously executed by shader core 214 of GPU 110.

In the examples of FIGS. 3A and 3B, GPU 110 receives both the tasks and the priority types. To provide the priority type to GPU 110, application 302 provides bits to an API indicating the priority type of each task. The API, in turn, provides this information to the driver of GPU 110. In an embodiment, GPU 110 includes a scheduling module that schedules the tasks to be executed on shader core 214 based, at least in part, on the priority type specified by the application.

Although the examples of FIGS. 3A and 3B illustrate shader core 214 executing only two streams of processing tasks, this is for illustrative purposes only, and not limitation. It is to be appreciated that shader core 214 may (substantially) simultaneously execute two or more streams of processing tasks generated by one or more applications.

Figure 4:
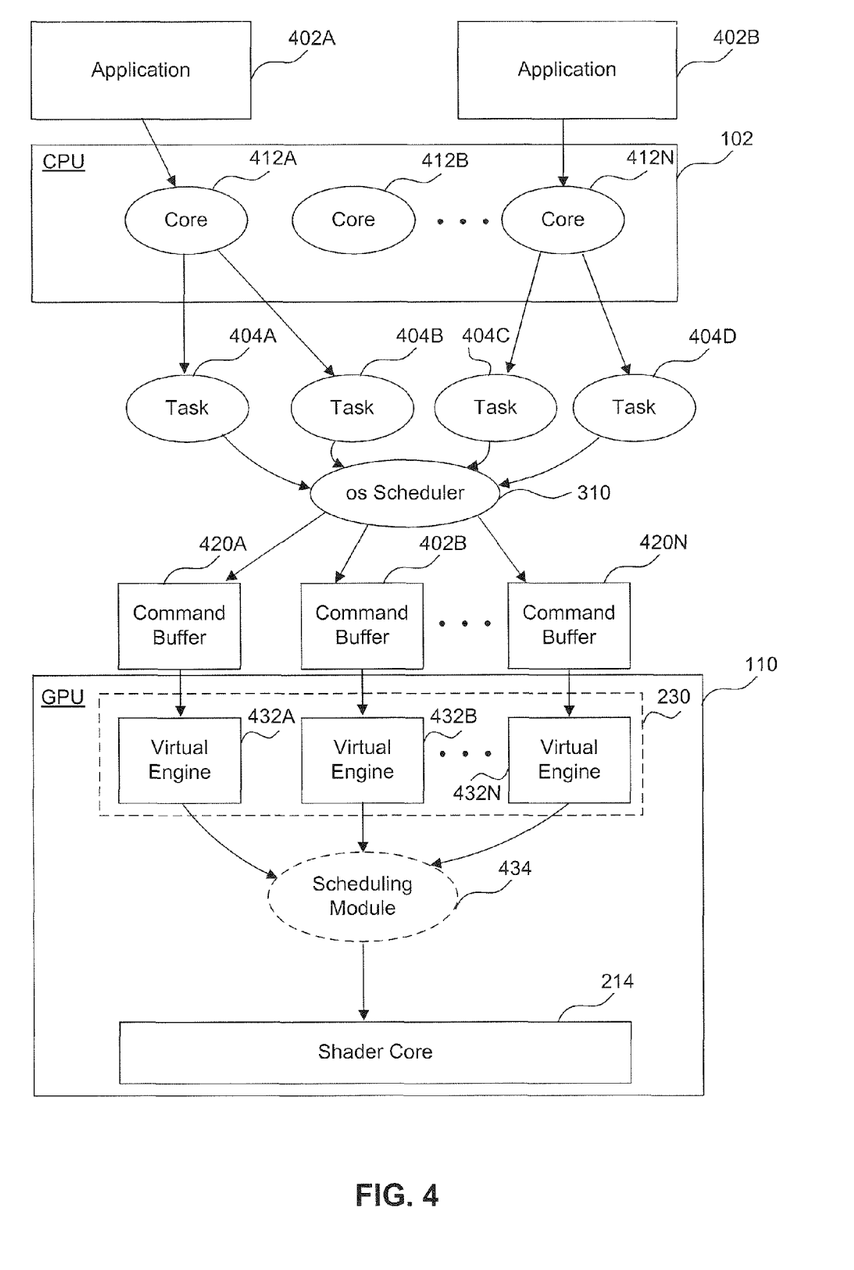
FIG. 4 illustrates a more-detailed example work flow for issuing tasks to virtual engines of a GPU in accordance with an embodiment of the present invention.

For example, FIG. 4 is an example workflow, illustrating various layers of software and hardware between one or more applications running on a computing system (e.g., computing system 100) and GPU 110 included in the computing system. In the embodiment of FIG. 4, there are two different types of processing units, CPU 102 and GPU 110. In addition, two applications—a first application 402A and a second application 402B—are running on the computer system. CPU 102 provides the primary functionality required by applications 402. For example, CPU 102 may include a plurality of cores 412A-N, wherein first application 402A runs primarily on a first core 412A and second application 402B runs primarily on a second core 412N.

During the course of running, applications 402 may generate a plurality of tasks 404A-D to be executed on GPU 110 rather than CPU 102. Tasks 404 may comprise data-parallel processing tasks (e.g., graphics-processing tasks, general-compute tasks, or the like) that GPU 110 can likely perform faster than CPU 102 could perform them in software. Each task 404 includes an indication of the priority type as specified by the applications 402 (like the priority type included in the tasks illustrated in FIGS. 3A and 3B). In a conventional system, an OS scheduler would provide tasks 404 to a single command buffer in a serial fashion, and a conventional GPU would serially process the tasks. Unlike such a conventional system, OS scheduler 310 provides each task 404 to one of a plurality of command buffers 420A-N based on the priority type specified by the applications 402. For example, OS scheduler 310 provides a first type of task (e.g., high-priority tasks) to first command buffer 420A, a second type of task (e.g., graphics-processing tasks) to second command buffer 420B, and so on.

GPU 110 includes a plurality of virtual engines 432A-N, each configured to service one of command buffers 420A-N. For example, a first virtual engine 432A is configured to service first command buffer 420A; a second virtual engine 432B is configured to service second command buffer 420B; and an N-th virtual engine 432N is configured to service N-th command buffer 420N. Tasks from virtual engines 432 are then (substantially) simultaneously executed by shader core 214 as described above. In an embodiment, a scheduling module 434 of GPU 110 schedules the tasks to be executed by shader core 214 based on at least the following conditions: (i) the priority type specified by applications 402; (ii) the relative priority between the tasks 404 processed by virtual engines 432; and (iii) the availability of resources within shader core 214. For example, scheduling module 434 may divide the resources of shader core 214 between concurrent tasks 404 based on demand, priority, and/or preset limits—while temporarily enabling any one of tasks 404 to fully consume the resources of GPU 110. By executing two or more different streams of processing tasks in shader core 214, GPU 110 provides the low-latency benefits of context switching without the overhead associated with the storing, swapping, and draining data associated with context switching.

V. Example Computer Implementation

Figure 5:
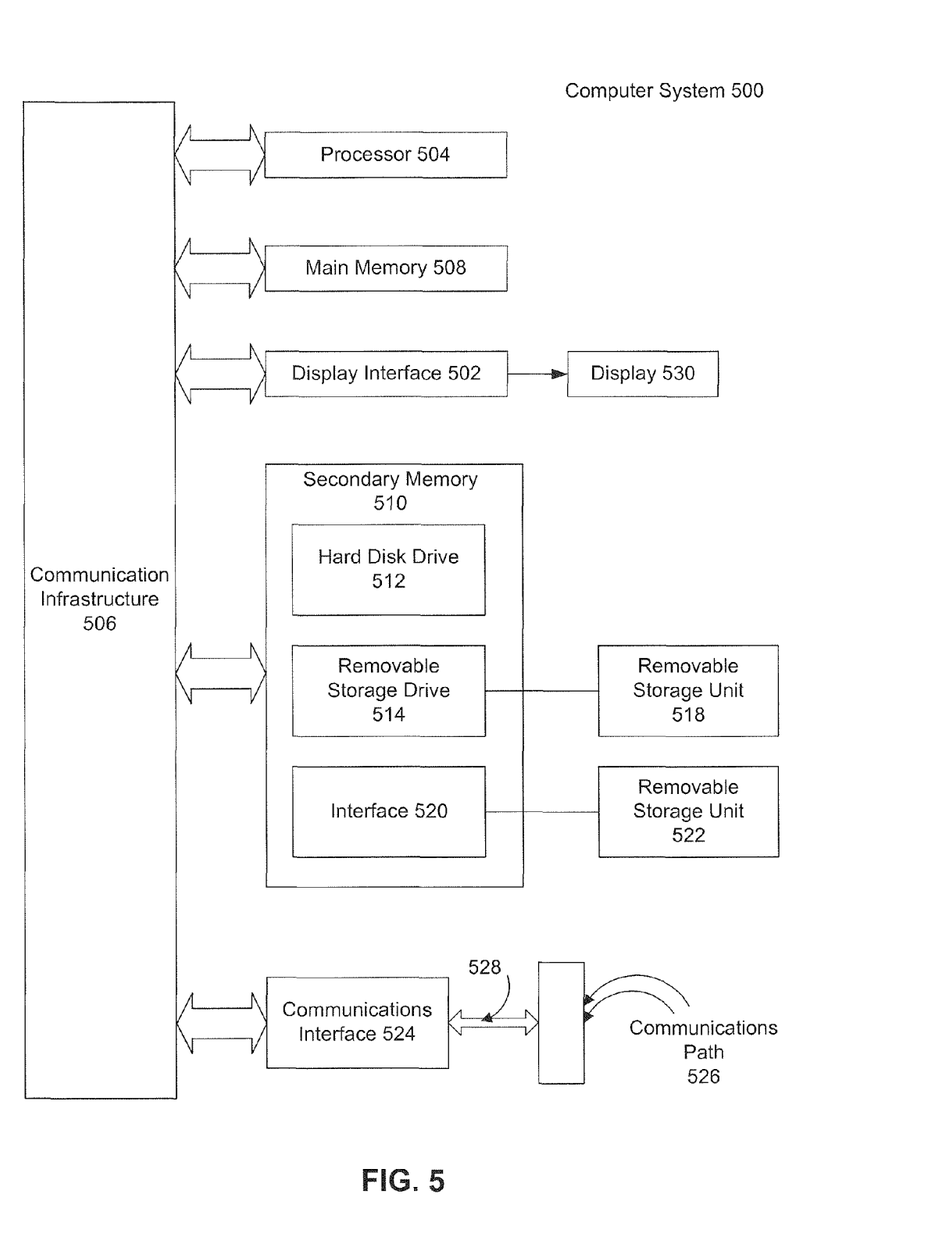
FIG. 5 depicts a block diagram of an example computer system in which an embodiment of the present invention may be implemented.

Embodiments of the present invention may be implemented using hardware, software or a combination thereof and may be implemented in one or more computer systems or other processing systems. An example of a computer system 500 is shown in FIG. 5.

Computer system 500 includes one or more processors, such as processor 504. Processor 504 may be a general purpose processor (such as, a CPU 102) or a special purpose processor (such as, a GPU 110). Processor 504 is connected to a communication infrastructure 506 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 500 includes a display interface 502 that forwards graphics, text, and other data from communication infrastructure 506 (or from a frame buffer not shown) for display on display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518 represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a Personal Computer Memory Card International Association (PCMCIA) slot and card, etc. Software and data transferred via communications interface 524 are in the form of signals 528 which may be electronic, electromagnetic, optical or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, an radio frequency (RF) link and other communications channels.

In this document, the term "computer-readable storage medium" is used to generally refer to media such as removable storage drive 514 and a hard disk installed in hard disk drive 512. These computer program products provide software to computer system 500.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment, the software may be stored in a computer program product and loaded into computer system 500 using removable storage drive 514, hard drive 512 or communications interface 524. The control logic (software), when executed by the processor 504, causes the processor 504 to perform the functions of embodiments of the invention as described herein.

VI. Example Software Implementations

In addition to hardware implementations of processing units (e.g., CPU 102 and/or GPU 110), such processing units may also be embodied in software disposed, for example, in a computer-readable medium configured to store the software (e.g., a computer-readable program code). The program code causes the enablement of embodiments of the present invention, including the following embodiments: (i) the functions of the systems and techniques disclosed herein (such as, providing tasks to GPU 110, scheduling tasks in GPU 110, executing tasks in GPU 110, or the like); (ii) the fabrication of the systems and techniques disclosed herein (such as, the fabrication of GPU 110); or (iii) a combination of the functions and fabrication of the systems and techniques disclosed herein.

This can be accomplished, for example, through the use of general-programming languages (such as C or C++), hardware-description languages (HDL) including Verilog HDL, VHDL, Altera HDL (AHDL) and so on, or other available programming and/or schematic-capture tools (such as circuit-capture tools). The program code can be disposed in any known computer-readable medium including semiconductor, magnetic disk, or optical disk (such as CD-ROM, DVD-ROM). As such, the code can be transmitted over communication networks including the Internet and internets. It is understood that the functions accomplished and/or structure provided by the systems and techniques described above can be represented in a core (such as a GPU core) that is embodied in program code and may be transformed to hardware as part of the production of integrated circuits.

VII. Conclusion

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:
1. An apparatus comprising:
   a plurality of engines associated with a first processing unit and configured to receive, from a scheduling module associated with a second processing unit, a plurality of tasks and to load state data associated with each of the plurality of tasks; and
   a shader core associated with the first processing unit and configured to receive the plurality of tasks from at least one of the plurality of engines and to execute a first task from the plurality of tasks while executing a second task from the plurality of tasks based on respective state data associated with each of the first and second tasks.

2. The apparatus of claim 1, wherein the shader core comprises:
- a first plurality of processing elements configured to execute the first task based on a first set of state data associated with the first task; and
- a second plurality of processing elements configured to execute the second task based on a second set of state data associated with the second task.

3. The apparatus of claim 1, wherein the plurality of engines comprises a first queue configured to receive the first task and a second queue configured to receive the second task.

4. The apparatus of claim 1, wherein the first task comprises a low-latency task and the second task comprises a regular-latency task.

5. The apparatus of claim 1, wherein the first task comprises a graphics-processing task and the second task comprises a general-compute task.

6. The apparatus of claim 1, wherein the shader core is configured to receive the plurality of tasks based on a priority associated with each of the plurality of tasks.

7. The apparatus of claim 1, wherein the shader core comprises a plurality of processing elements, wherein each of the processing elements corresponds to a respective engine from the plurality of engines and is configured to execute one or more tasks from its respective engine.

8. The apparatus of claim 1, wherein the shader core comprises a plurality of processing elements, wherein at least one of the processing elements is configured to dedicate a first processing time to the first task and a second processing time to the second task.

9. A computer-program product comprising a computer-readable storage medium containing instructions that, if executed on a computing device, define an apparatus comprising:
- a plurality of engines associated with a first processing unit and configured to receive, from a scheduling module associated with a second processing unit, a plurality of tasks and to load state data associated with each of the plurality of tasks; and
- a shader core associated with the first processing unit and configured to receive the plurality of tasks from at least one of the plurality of engines and to execute a first task from the plurality of tasks while executing a second task from the plurality of tasks based on respective state data associated with each of the first and second tasks.

10. The computer-program product of claim 9, wherein the shader core comprises:
- a first plurality of processing elements configured to execute the first task based on a first set of state data associated with the first task; and
- a second plurality of processing elements configured to execute the second task based on a second set of state data associated with the second task.

11. The computer-program product of claim 9, wherein the plurality of engines comprises a first queue configured to receive the first task and a second queue configured to receive the second task.

12. The computer-program product of claim 9, wherein the first task comprises a low-latency task and the second task comprises a regular-latency task.

13. The computer-program product of claim 9, wherein the first task comprises a graphics-processing task and the second task comprises a general-compute task.

14. The computer-program product of claim 9, wherein the shader core is configured to receive the plurality of tasks based on a priority associated with each of the plurality of tasks.

15. A computing system comprising:
- a memory;
- a first processing unit; and
- a bus coupled to the memory and the first processing unit, wherein the first processing unit comprises:
  - a plurality of engines configured to receive, from a scheduling module associated with a second processing unit, a plurality of tasks and to load state data associated with each of the plurality of tasks; and
  - a shader core configured to receive the plurality of tasks from at least one of the plurality of engines and to execute a first task from the plurality of tasks while executing a second task from the plurality of tasks based on respective state data associated with each of the first and second tasks.

16. The computing system of claim 15, wherein the shader core comprises:
- a first plurality of processing elements configured to execute the first task based on a first set of state data associated with the first task; and
- a second plurality of processing elements configured to execute the second task based on a second set of state data associated with the second task.

17. The computing system of claim 15, wherein the plurality of engines comprises a first queue configured to receive the first task and a second queue configured to receive the second task.

18. The computing system of claim 15, wherein the first task comprises a low-latency task and the second task comprises a regular-latency task.

19. The computing system of claim 15, wherein the first task comprises a graphics-processing task and the second task comprises a general-compute task.

20. The computing system of claim 15, wherein the shader core is configured to receive the plurality of tasks based on a priority associated with each of the plurality of tasks.

21. A computer-implemented method comprising:
- receiving, with a plurality of engines associated with a first processing unit, a plurality of tasks, wherein the plurality of engines receive the plurality of tasks from a scheduling module associated with a second processing unit;
- loading state data associated with each of the plurality of tasks;
- receiving, with a shader core associated with the first processing unit, the plurality of tasks from at least one of the plurality of engines; and
- executing, with the shader core, a first task from the plurality of tasks while executing a second task from the plurality of tasks based on state data associated with each of the first and second tasks.

22. The computer-implemented method of claim 21, wherein the executing comprises:
- executing the first task in a first plurality of processing elements of the shader core based on a first set of state data associated with the first task; and
- executing the second task in a second plurality of processing elements of the shader core based on a second set of state data associated with the second task.

23. The computer-implemented method of claim 21, wherein the receiving, with the plurality of engines, the plurality of tasks comprises:
- queuing the first task in a first queue; and
- queuing the second task in a second queue.

24. The computer-implemented method of claim 21, wherein the first task comprises a low-latency task and the second task comprises a regular-latency task.

25. The computer-implemented method of claim 21, wherein the first task comprises a graphics-processing task and the second task comprises a general-compute task.

26. The computer-implemented method of claim 21, wherein the receiving, with the shader core, the plurality of tasks from the at least one of the plurality of engines comprises receiving, with the shader core, the plurality of tasks based on a priority associated with each of the plurality off tasks.

27. A computer-implemented method comprising:
- receiving, from a first processing unit, a plurality of tasks from one or more applications, wherein each task comprises an indication of a priority type; and
- providing, to a second processing unit, the plurality of tasks and the indication of the priority type associated with each task, wherein the second processing unit comprises:
- a plurality of engines configured to receive the plurality of tasks and to load state data associated with each of the plurality of tasks; and
- a shader core configured to receive the plurality of tasks from at least one of the plurality of engines and to execute a first task from the plurality of tasks while executing a second task from the plurality of tasks based respective state data associated with each of the first and second tasks.

* * * * *